United States Patent [19]
Tickett

[11] 3,735,775
[45] May 29, 1973

[54] PIPE FITTING
[75] Inventor: Edward F. Tickett, El Paso, Tex.
[73] Assignee: Alex B. Reynolds, St. Louis, Mo. ; a part interest
[22] Filed: Feb. 22, 1971
[21] Appl. No.: 117,761

[52] U.S. Cl. ............................................. 137/318
[51] Int. Cl. ....................... B23b 41/08, F16e 41/04
[58] Field of Search ..................... 137/315, 317, 318; 251/145, 146, 149.6; 138/94; 30/101

[56] References Cited
UNITED STATES PATENTS
1,174,342   3/1916   O'Brien .......................... 137/317 X
1,811,046   6/1931   Goldhagen ........................... 30/101
3,004,338   10/1961  Turner ................................ 30/101

Primary Examiner—Martin P. Schwadron
Assistant Examiner—David R. Matthews
Attorney—Cohn and Powell

[57] ABSTRACT

A pipe fitting which is capable of being attached to an existing pipe line for diverting a part of the flow of the pipe line through a branch line connected to the fitting, without interrupting the flow through the pipe line. A cutter carried by the fitting permits cutting of the pipe as the fitting is applied thereto to enable a part of the flow through the pipe line to be diverted to the branch line; and a valve carried by the fitting shuts off the flow from the fitting until the branch line is applied to the fitting, and enables the flow to the branch line to be shut off for any servicing operations subsequently required in connection with the branch line.

9 Claims, 10 Drawing Figures

3,735,775
SHEET 1 OF 2
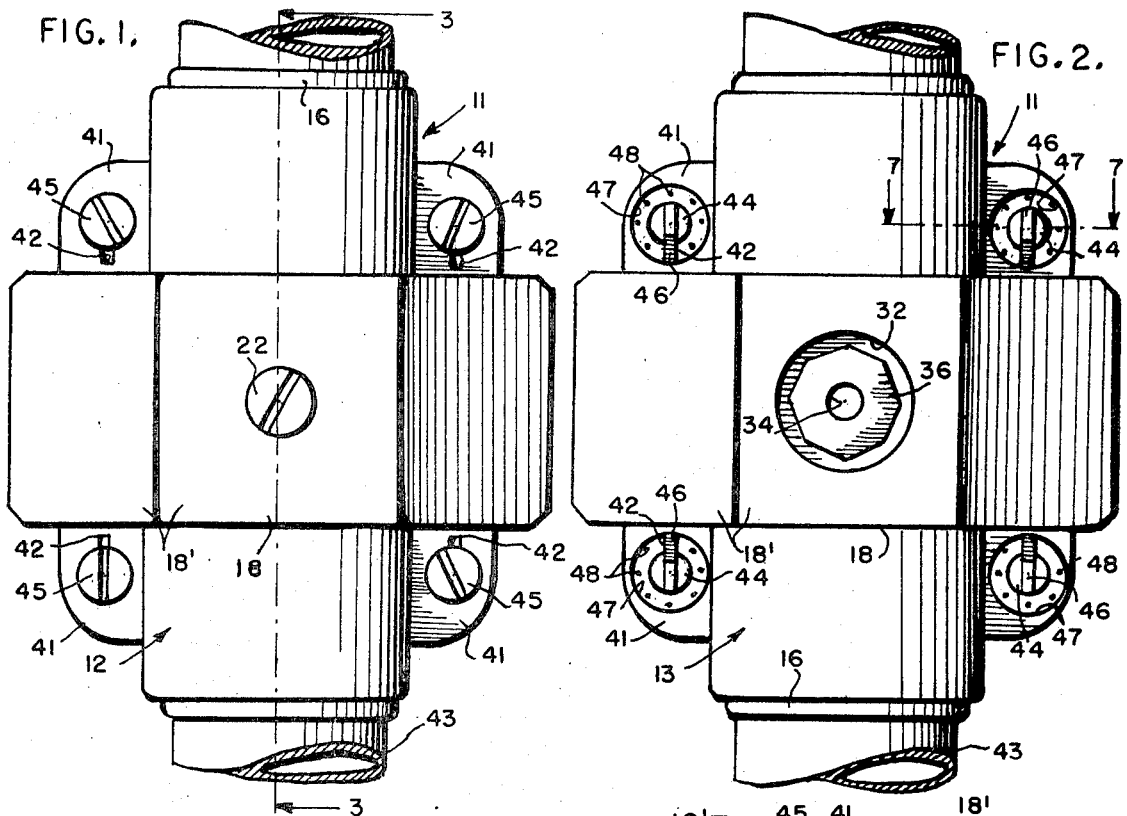
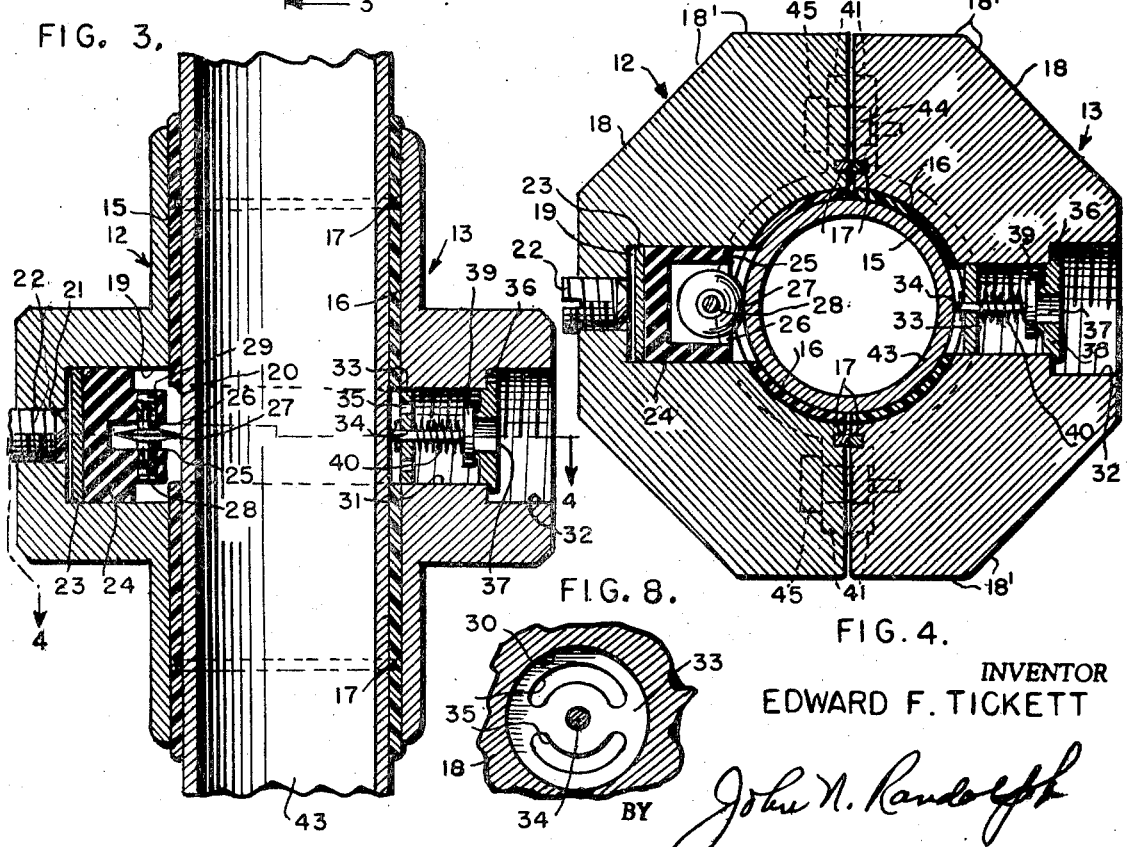
INVENTOR
EDWARD F. TICKETT
BY *John N. Randolph*
ATTORNEY

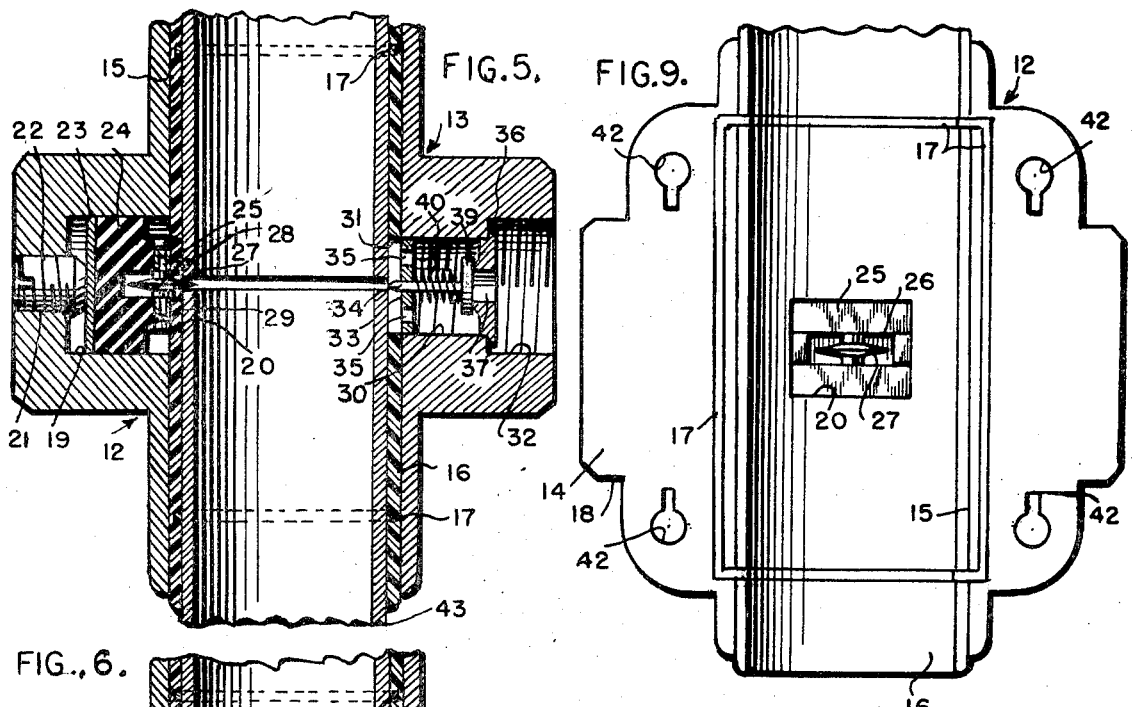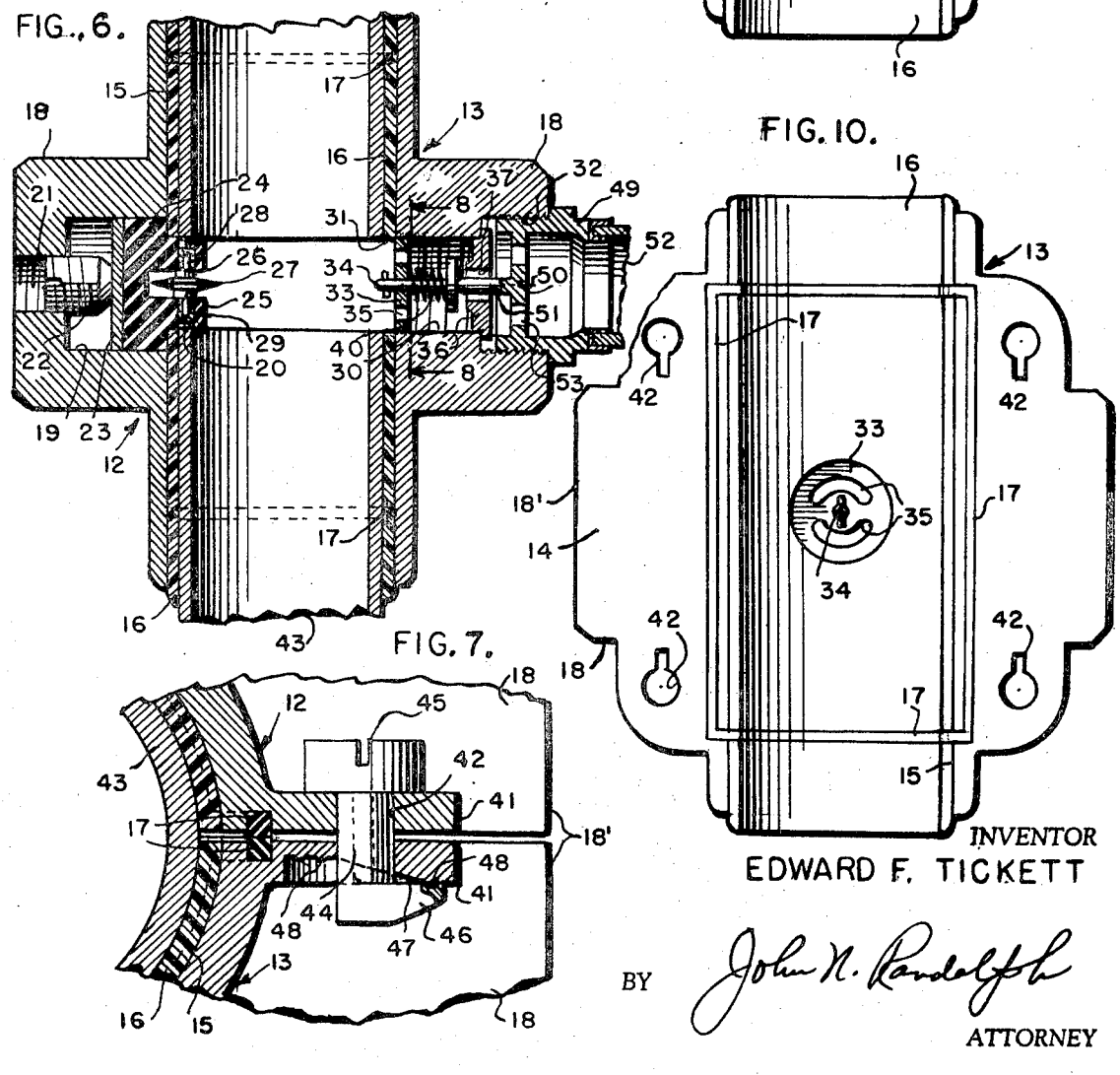

:::page
PIPE FITTING

SUMMARY

It is a primary object of the present invention to provide a novel pipe line connection by which a branch line can be attached to a pipe line without terminating the flow through the line, or cutting, threading, joining nipples, or the like, in accomplishing the connection.

Another object of the invention to provide a pipe fitting which will provide cathodic protection between divided sections of the pipe line which are coupled together by the fitting.

A further object of the invention is to provide a pipe fitting formed of coupling halves which are connected together around an existing pipe line, one of which carries means for cutting through the pipe line and the other of which is provided with a valve controlled branch line connection.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 1 is a side elevational view of one-half of the pipe fitting shown assembled on a pipe line;

FIG. 2 is a similar view of the other half of the fitting;

FIG. 3 is a longitudinal sectional view taken substantially along a plane as indicated by the line 3—3 of FIG. 1;

FIG. 4 is a cross sectional view through the fitting, taken substantially along a plane as indicated by the line 4—4 of FIG. 3;

FIG. 5 is a sectional view similar to FIG. 3 but showing the same parts after the cutting operation has been completed;

FIG. 6 is a view similar to FIG. 5 but showing the fitting parts after connection of the branch line thereto;

FIG. 7 is an enlarged fragmentary sectional view taken substantially along a plane as indicated by the line 7—7 of FIG. 2, but with one of the parts shown in a different position;

FIG. 8 is an enlarged fragmentary sectional view taken substantially along a plane as indicated by the line 8—8 of FIG. 6;

FIG. 9 is an elevational view of the inner side of one of the halves of the fitting, and FIG. 10 is a similar view of the other fitting half.

DESCRIPTION OF THE PREFERRED EMBODIMENT

Referring more specifically to the drawing, the pipe fitting in its entirety and comprising the invention is designated generally 11 and includes fitting or coupling halves 12 and 13. The coupling halves 12 and 13, as seen in FIGS. 9 and 10, each have substantially flat inner faces 14 which straddle a central portion of arcuate cross section defining a centrally disposed longitudinally extending groove which extends from end to end thereof and which is substantially semi-circular in cross section, as best seen in FIG. 4. The grooves 15 open through the faces 14 and are provided with liners 16 of resilient plastic insulating material which extend to beyond the ends of said grooves. Each coupling half is provided with a continuous resilient sealing strip 17 having portions extending longitudinally along opposite sides of the groove 15 embedded in and protruding from said faces 14, and transverse end portions extending across the liners 16 embedded therein and protruding therefrom, as clearly illustrated in FIGS. 9 and 10.

The coupling sections 12 and 13 have central portions 18 which are externally thickened and multi-sided, as seen in FIG. 4, to provide wrench lands 18'. The central portion of the enlargement 18 of the fitting half 12 is recessed to provide a socket 19 which opens into the groove 15 thereof, midway of the side edges and ends of said groove and registers with an opening 20 of the liner 16, as seen in FIG. 9, which is somewhat smaller than the socket 19, as will hereinafter become apparent. Said thickened portion 18 has a threaded bore 21 opening outwardly thereof and into the socket 19 for threadedly receiving a follower screw 22, the inner end of which bears against the outer side of a metal follower plate 23. A block 24 of electrical insulating material bears against the inner side of the plate 23 and has a close fitting sliding engagement in the inner portion of the socket 19. An inner portion 25 of the block 24 is reduced in width, at the top and bottom of said block or endwise of the coupling half 12, and said reduced portion 25 is sized to fit snugly into the opening 20. The portion 25 has a recess 26 disposed crosswise of the coupling half 12 to accommodate a cutting wheel 27 which is mounted for rotation therein on an axle 28. The ends of the axle 28 are secured in portions of a bore 29 formed in the block portion 25 and which intersects the recess 26.

The intermediate portion of the enlargement 18 of the coupling half 13 is provided with a threaded bore 30 having an inner end opening through an opening 31 of the liner 16 of said coupling half and an outer end opening into a larger threaded bore portion 32 which has an open outer end. A disc 33 threadedly engages the inner end of the bore 30 and provides a guide for a valve stem 34 which is slidably mounted in the center thereof. The disc 33 is provided with openings or ports 35, as best seen in FIG. 10. A plug 36 is threadedly mounted in the outer end of the bore 30 and has a large central opening 37. The inner side of the plug 36 is thickened around the opening 37 to form a valve seat 38 for a valve 39 which is mounted on the outer end of the valve stem 34 and which is urged into engagement with the seat 38 by a coil spring 40 which is carried by the valve stem, between the disc 33 and valve 39.

The coupling halves 12 and 13 are each provided with wings 41 located beyond the enlargements 18 and on opposite sides of the grooves 15 and which are provided with keyhole shaped openings 42, as seen in FIGS. 9 and 10. When the coupling sections 12 and 13 are assembled around a pipe 43 in opposed relation to one another, as seen in FIGS. 1 to 4, the openings 42 of the two sections are disposed in registration with one another to receive bolts 44 each having a kerfed head 45 at one end and a lateral extension of key 46 at its opposite end. The heads 45 abut the wings 41 of the section 12. The outer sides of the wings 41 of the section 13, as seen in FIGS. 2 and 7, have substantially circular inclined surfaces 47 around the openings 42 thereof, the deepest ends of which are disposed on one side of the lateral extensions of said openings 42 and slope upwardly therefrom. Said surfaces 47 have small spaced bosses 48. The bolts 44 are turned by a screw driver in directions to cause the keys 46 to move up the surfaces 47 from the deepest ends thereof so that said surfaces form cams engaged by the keys 46 for drawing the sections 12 and 13 toward one another and tightly around the pipe 43. The bosses 48 retain the keys 46 in different adjusted positions.

The exterior surface of the part of the pipe 43 to which the coupling 11 is to be applied is initially cleaned of all coating materials or foreign matter before application of the fitting thereto, and the fastenings 44 are only partially tightened initially. The initial position of the fitting 11 on the pipe 43 is illustrated in FIG. 3. With the fitting thus disposed, the feed screw 22 is advanced from its position of FIG. 3 to move the cutting wheel 27 inwardly and against the pipe 43. A wrench or the like, not shown, is then applied to the lands 18' for rotating the fitting on the pipe 43 to cause the wheel 27 to cut circumferentially around the pipe. The screw 22 is intermittently advanced to advance the wheel 27 until the wheel completely cuts through the pipe, as illustrated in FIG. 5. The sections of the pipe 43 are then displaced away from one another to their positions of FIG. 6, and the screw 22 is advanced to move the block portion 25 into the gap between the pipe sections. The bolts 44 are then fully tightened to cause the portions of the seals 17 embedded in the faces 14 to be compressed against one another, as seen in FIG. 7, and to cause the portions of the seals 17 which are embedded in and protrude from the liner 16 to be compressed against the sections of the pipe 43 to provide a fluid tight seal around the gap formed between the pipe sections, to prevent any leakage of fluid from the pipe at the coupling 11. The insulator liners 16 and the insulator block 24 afford cathodic protection between the pipe sections.

An externally threaded coupling sleeve 49, as seen in FIG. 6, is then threaded into the threaded bore 32. Before this is accomplished, the valve 39 is in its closed position of FIG. 5 to prevent any escape of the fluid from the pipe 43 by way of the port 37. The coupling 49 has a partition wall 50 from which projects a centrally disposed pin 51. The pin 51 extends through the inner end of the coupling 49 and centrally through the port 37 so that as the coupling 49 is advanced into the bore 32, said pin 51 will move into engagement with the valve 39 and will unseat or open said valve, as seen in FIG. 6. A branch pipe or conduit 52 is swively connected to the other end of the coupling 49. The partition 50 has ports 53 through which the fluid from the pipe 43 can pass into the conduit 52 after passing through the open port 37 and the ports 35.

The valve 39 will remain open at all times while the branch conduit 52 is available for use. The pipe 43 could constitute a main water or gas line, and should some service be required on the branch conduit 52, such as servicing a gas or water meter, the coupling 49 could be withdrawn sufficiently to allow the valve 39 to resume its closed position of FIG. 5 to cut off the supply to the branch conduit 52 while the servicing was being accomplished and without interrupting the flow through the main line 43.

Various modifications and changes are contemplated and may be resorted to, without departing from the function or scope of the invention.

I claim as my invention:

1. A pipe fitting comprising coupling halves adapted to fit around a pipe containing a fluid under pressure, means for attaching said coupling halves together, a cutter carried by one of said coupling halves for engaging and cutting the pipe into sections when the coupling is revolved around the pipe, means carried by the coupling halves and forming a fluid seal around the gap between the pipe sections when said sections are displaced away from one another, said other coupling half having an outlet port, a valve for closing said outlet port, and a branch conduit having a coupling engageable with said outlet port and provided with means for displacing said valve to an open position to allow a part of the fluid to pass from said pipe to the branch conduit.

2. A pipe fitting as in claim 1, said cutter comprising a cutting wheel, a block in which said cutting wheel is rotatably mounted, said block being mounted for radial sliding movement in the first mentioned coupling half, and means for displacing the block inwardly for advancing the cutting wheel toward the pipe.

3. A pipe fitting as in claim 1, and means for insulating the separated pipe sections from one another.

4. A pipe fitting as in claim 3, said insulating means including liners of insulating material carried by the coupling halves and engaged around the portion of the pipe embraced by the said coupling.

5. A pipe fitting as in claim 4, said insulating means additionally including a block of insulating material constituting a support for the pipe cutter and including a part engaging between the separated pipe sections.

6. A pipe fitting as in claim 4, cam means associated with the fastenings connecting the coupling halves for displacing the coupling halves toward one another when said fastenings are rotated to provide a partial securement of the coupling around the pipe during the cutting of the pipe and the separation of the pipe sections and a tight securement of the coupling around the separated pipe sections.

7. A pipe fitting as in claim 1, said outlet port comprising a threaded bore having an inner section of smaller diameter than an outer section thereof, a valve stem, an apertured valve stem guide mounted in an inner end of said inner section, a plug threadedly mounted in the other end of said inner bore section having a central port and an inwardly facing annular valve seat surrounding said port and engageably by said valve, and a spring carried by the valve stem and bearing against the valve stem guide and valve for urging said valve into a closed position against said seat.

8. A pipe fitting as in claim 7, said branch conduit coupling having an apertured partition wall, and a pin carried by said wall and extending through the plug port and constituting the means for displacing the valve to an open position.

9. A pipe fitting as in claim 1, said coupling halves having wrench lands adapted to be engaged by a tool for turning the coupling on the pipe during the cutting operation.

* * * * *